US011050800B2

(12) United States Patent
Chiang et al.

(10) Patent No.: US 11,050,800 B2
(45) Date of Patent: Jun. 29, 2021

(54) NETWORK ASSIGNING QOS FOR SERVICE BASED ON CODEC EXCHANGED PEER-TO-PEER

(71) Applicant: T-MOBILE USA, INC., Bellevue, WA (US)

(72) Inventors: Hsin-Fu Henry Chiang, Bellevue, WA (US); Karthik Iyer, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 2 days.

(21) Appl. No.: 16/380,655

(22) Filed: Apr. 10, 2019

(65) Prior Publication Data

US 2020/0329078 A1     Oct. 15, 2020

(51) Int. Cl.
*H04L 29/06* (2006.01)
*H04W 76/10* (2018.01)

(52) U.S. Cl.
CPC ...... *H04L 65/1086* (2013.01); *H04L 65/1016* (2013.01); *H04L 65/80* (2013.01); *H04W 76/10* (2018.02); *H04L 65/607* (2013.01)

(58) Field of Classification Search
CPC . H04L 65/1086; H04L 65/1016; H04L 65/80; H04L 65/607; H04W 76/10
See application file for complete search history.

(56) References Cited

U.S. PATENT DOCUMENTS

| | | | |
|---|---|---|---|
| 2011/0090902 A1* | 4/2011 | Jung | H04L 65/1006 370/352 |
| 2011/0141890 A1* | 6/2011 | Giaretta | H04L 65/1069 370/232 |
| 2011/0179437 A1* | 7/2011 | Foti | H04L 65/80 725/25 |
| 2014/0126389 A1* | 5/2014 | Lau | H04M 15/63 370/252 |
| 2015/0078295 A1* | 3/2015 | Mandyam | H04L 65/403 370/329 |
| 2016/0295579 A1* | 10/2016 | Pham | H04W 72/085 |
| 2019/0098692 A1* | 3/2019 | Atarius | H04M 15/66 |

* cited by examiner

*Primary Examiner* — Jeffrey M Rutkowski
*Assistant Examiner* — Chae S Lee
(74) *Attorney, Agent, or Firm* — Marshall, Gerstein & Borun LLP

(57) ABSTRACT

Systems and methods for allocating quality of service (QoS) to real-time communication sessions between user equipment via a communication network are provided. Such systems and methods include identifying an encoding scheme to be used for the communication session, determining a QoS requirement for the communication session based upon the encoding scheme, and determining whether a general communication channel (e.g., a non-GBR channel) of the network meets the QoS requirement. When the general communication channel meets the QoS requirement, a corresponding bearer is used for the communication session. When the general communication channel does not meet the QoS requirement, a bearer associated with a dedicated communication channel (e.g., a GBR channel) is used. Thus, communication sessions using higher quality encoding schemes may be established through general communication channels, reducing congestion in dedicated communication channels.

20 Claims, 4 Drawing Sheets

NETWORK ASSIGNING QOS FOR SERVICE BASED ON CODEC EXCHANGED PEER-TO-PEER

FIELD OF THE DISCLOSURE

The present disclosure generally relates to allocation of quality of service (QoS) by communication channel selection for communication sessions, particularly selection of communication channels for video communication based upon QoS requirements associated with data encoding schemes.

BACKGROUND

Existing communication networks enable voice and video communication between computing devices, including mobile computing devices. Such communication may be handled by either dedicated communication channels having guaranteed bit rate (GBR) or by non-guaranteed bit-rate (non-GBR) channels. While GBR channels offer superior connectivity in some situations, the dedication of network resources for such channels reduces overall network performance, which can degrade communication quality. With improvements in encoding schemes used for mobile communication generally and for video communication in particular, GBR channels are often unnecessary between devices using efficient encoding schemes. Not all devices are configured to use such efficient encoding schemes, however. Therefore, GBR channels are used for communication sessions even when non-GBR channels would exceed the QoS needed for such communication.

Current techniques only distinguish between communication sessions based on type of content to be communicated (e.g., video or voice), resulting in video communication sessions being unnecessarily assigned to GBR channels because the encoding scheme is not considered. Additionally, during times of peak network voice or data usage, non-GBR channels may be insufficient for video communication sessions even for devices using such efficient encoding schemes. At such times, GBR channels should generally be used. Thus, using non-GBR channels for all voice communication sessions would also result in insufficient quality for network users under some conditions.

SUMMARY

As described further herein, the disclosure generally relates to systems, methods, and non-transitory computer-readable media storing instructions for allocation of quality of service (QoS) to communication sessions between user equipment (UE), such as video communication sessions. In an embodiment, a system for UE-controlled QoS allocation is provided, the system comprising: (i) a communication interface communicatively coupled to a communication network; (ii) one or more non-transitory storage media configured to store processor-executable instructions; (iii) one or more processors operatively connected to the communication interface and the one or more non-transitory storage media and configured to execute the processor-executable instructions. The communication network is configurable to support two or more levels of QoS, wherein a first level of QoS of the two or more levels of QoS is a guaranteed bit rate (GBR) level of QoS and a second level of QoS of the two or more levels of QoS is a non-GBR level of QoS, wherein the first level of QoS corresponds to a first channel for supporting data radio bearers assigned a GBR level of QoS and the second level of QoS corresponds to a second channel for supporting data radio bearers assigned a non-GBR level of QoS. The first channel supports fewer concurrent data radio bearers than the second channel. When executed by the one or more processors, the processor-executable instructions cause the system to: (i) receive, via the communication interface and from a first UE, a request to establish a communication session with a second UE, the request indicating a type of the communication session and one or more encoding schemes supported by the first UE for communications associated with the indicated type of the communication session; (ii) analyze the one or more encoding schemes to identify a highest quality encoding scheme of the one or more encoding schemes; (iii) determine a QoS requirement to support communications sessions associated with the highest quality encoding scheme; (iv) determine the second level of QoS meets the QoS requirement associated with the highest quality encoding scheme; and (v) cause the first UE to establish the communication session using a data radio bearer associated with the second channel.

The computer system may further receive an identifier associated with the second UE as part of the request to establish the communication session. The processor-executable instructions may then further cause the computer system to transmit an indication of the request to establish the communication session to the second UE and receive a list of encoding schemes supported by the second UE for communications associated with the indicated type of communication session from the second UE, via the communication interface. Using such list of encoding schemes, the computer system may then identify the highest quality encoding scheme by identifying the highest quality encoding scheme from at least one encoding scheme that is included in the list of encoding schemes supported by the second UE and that is included in the one or more encoding schemes supported by the first UE.

In some embodiments, the one or more processors may be communicatively coupled to a network database, such that the processor-executable instructions further cause the system to query from the network database network characteristic data relating to QoS of at least the second channel. The system may then determine the second level of QoS corresponding to the second channel from the network characteristic data. In some such embodiments, the network characteristic data may comprise current network congestion data. Similarly, in further embodiments, the one or more processors may be communicatively coupled to an account database, such that the processor-executable instructions further cause the system to query an account record associated with the first UE from the account database to obtain a list of permitted encoding schemes. In some such embodiments, the computer system may further identify the highest quality encoding scheme from at least one encoding scheme that is included in the list of permitted encoding schemes and that is included in the one or more encoding schemes supported by the first UE.

When the request to establish the communication session is a request to upgrade an ongoing voice communication session with the second UE to a video communication session, the processor-executable instructions may further cause the computer system to cause the first UE to disconnect from another data radio bearer associated with the first channel following the first UE establishing the communication session using the data radio bearer associated with the second channel. Similarly, the system may be configured to handle requests to downgrade the communication session. When the communication session is a video communication session and the system receives a request to downgrade the communication session to a voice communication session from the first UE via the communication interface, the processor-executable instructions may cause the system to cause the first UE to establish a connection via another data radio bearer associated with the first channel for the voice communication session and cause the first UE to disconnect from the data radio bearer associated with the second channel.

In various embodiments, the communication network may be configured in accordance with a new radio (NR)/5G protocol, and the communication interface may interface with a core network of the communication network. Likewise, the data radio bearer may be an end-to-end bearer or an evolved packet system (EPS) bearer.

This summary is not comprehensive and is necessarily limited to certain aspects of the invention described herein. Additional or alternative components, aspects, functions, or actions may be included in various embodiments, as described further below.

DETAILED DESCRIPTION

The systems and methods described herein relate to improvements in communication network operation by selecting channels to be used for communication sessions between user devices based at least in part upon encoding schemes used by the devices. When a communication session is established, the quality of service (QoS) required for the session is determined using information regarding the encoding scheme to be used. The required QoS is then compared against a measured or expected QoS of at least one channel within the network to determine whether the channel is sufficient for the communication session. When a general communication channel (e.g., a non-GBR channel) offers a QoS that meets or exceeds the required QoS for the communication session, the communication session is established using the general communication channel. When such general communication channel is insufficient, the communication session may instead by established using a dedicated communication channel (e.g., a GBR channel). Thus, network resources are efficiently used, improving network performance for all users.

Figure 1:
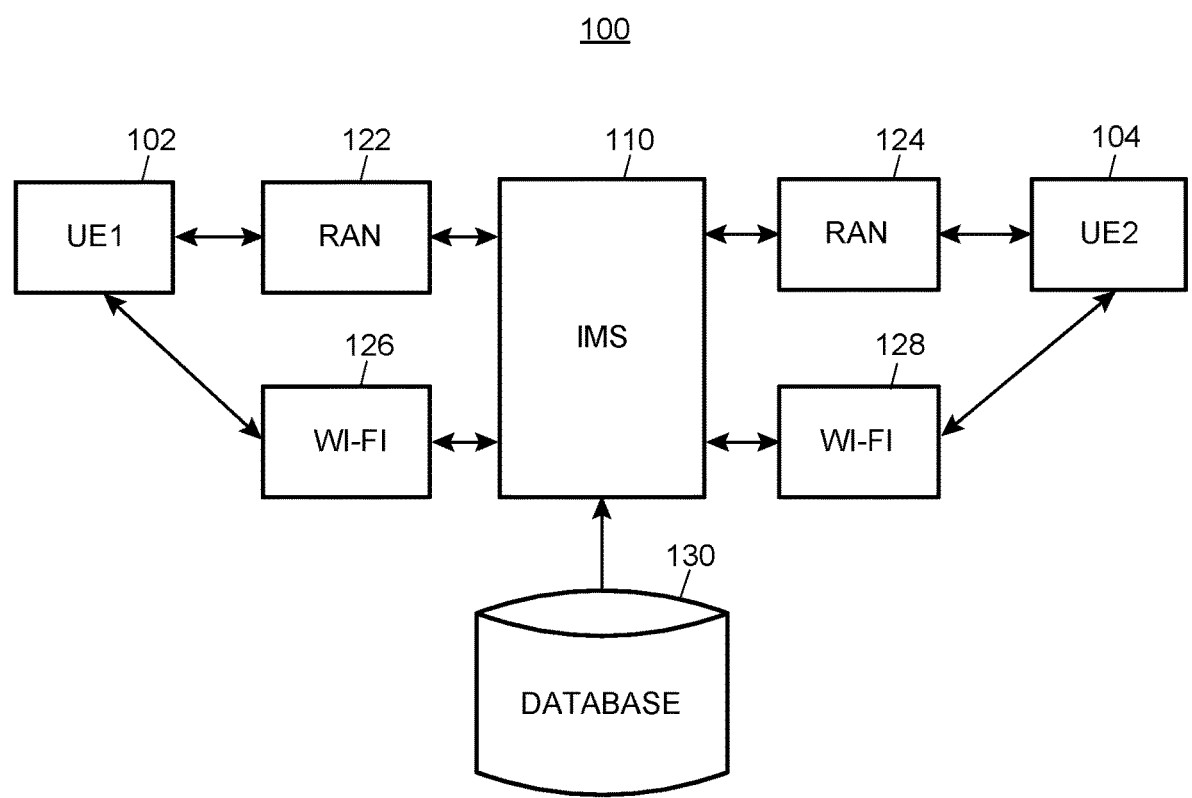
FIG. 1 illustrates an example mobile communication environment in which the techniques described herein may be implemented.

FIG. 1 illustrates an example mobile communication environment 100 in which the techniques described herein may be implemented. The mobile communication environment 100 includes a plurality of devices of user equipment (UEs), including a first UE 102 and a second UE 104 (each a "UE" and, together, the "UEs"). Each of the UEs is indirectly connected to an IP Multimedia Subsystem (IMS) component 110 (e.g., an SIP server or an application server within an IMS), which controls communication between the first UE 102 and the second UE 104. Although not shown, multiple IMS components 110 may be connected to facilitate remote communication between the UEs according to known techniques. The first UE 102 and the second UE 104 communicate through a communication network including the IMS component 110 and additional components using an agreed upon data encoding scheme via a peer-to-peer communication connection during a communication session.

Through the communication network and the components illustrated in the mobile communication environment 100, the first UE 102 and the second UE 104 may establish communication sessions for real-time communication of audio or video data. The communication network may be configured to transmit data according to various standards, including Long Term Evolution (LTE)/Evolved Universal Mobile Telecommunications System (UMTS) Terrestrial Radio Access Network (E-UTRAN) protocol or new radio (NR)/5G protocol. The communication network is configured to support two or more levels of QoS, including a dedicated communication level (e.g., a GBR level of QoS) and a general communication level (e.g., a non-GBR level of QoS). Each of the levels of QoS is associated with one or more communication channels for supporting data radio bearers assigned to corresponding QoS levels. Thus, the communication network may include a first level of QoS corresponding to a first channel supporting GBR data radio bearers and a second level of QoS corresponding to a second channel supporting non-GBR data radio bearers. In such embodiments, the first channel (i.e., the dedicated communication channel supporting GBR bearers) supports fewer concurrent data radio bearers than the second channel (i.e., the general communication channel supporting non-GBR bearers). In various embodiments, the data radio bearers may be end-to-end bearers or evolved packet system (EPS) bearers.

The IMS component 110 may comprise one or more servers, switches, gateways, or nodes in the mobile communication environment 100. The IMS component 110 may be connected to the first UE 102 via either a radio access network (RAN) 122 or a Wi-Fi router 126, and the IMS component 110 may be similarly connected to the second UE 104 via either a RAN 124 or a Wi-Fi router 128. Such RAN or Wi-Fi components serve as access points to the communication network for the UEs 102 and 104, while the IMS component 110 is configured to control aspects of communication data flow within the communication network. Each UE 102 or 104 may connect to the network via various RAN or Wi-Fi components at various times and locations, and such connections may affect the connection quality (e.g., throughput, loss rate, latency, etc.). Connection quality will also vary between locations and times based upon physical characteristics of the network components and use of the network by other UEs. Additional or alternative communication components may be included in the communication network in various embodiments.

The IMS component 110 is further connected to a database 130 to obtain data regarding the UEs, users thereof, network characteristics, or other data relating to the communication network. Such database 130 may be part of a home subscriber subsystem (HSS), including a unified data manager (UDM) configured to enforce network operator policy decisions. In some embodiments, the database 130 may include a network database containing network characteristic data relating to QoS of relevant portions of the communication network or relevant channels. In some embodiments, the network characteristic data may include current network congestion data, such as network utilization rates, active connections, latency, bandwidth, error loss rate, etc. In further embodiments, the network characteristic data may include estimated network characteristics, such as historical or expected QoS for each channel or sub-network. Such network characteristic data may be used to determine whether dedicated or general communication channels should be used when establishing communication sessions. In additional or alternative embodiments, the database 130 may include an account database containing account data associated with UEs. Such account data may indicate, for example, a list of permitted encoding schemes for types of communication sessions for a UE.

The mobile communication environment 100 illustrated in FIG. 1 is simplified for clarity, as mobile communication environments can include various alternative arrangements of components at various locations and times. For example, only two user UEs are illustrated, while typical mobile computing environments have thousands or millions of UEs capable of establishing communication sessions. Additionally, only one IMS component 110 is shown, while multiple IMS components 110 are typically configured to communicate with each other at remote distances according to known techniques through connections within a core network.

Figure 2:
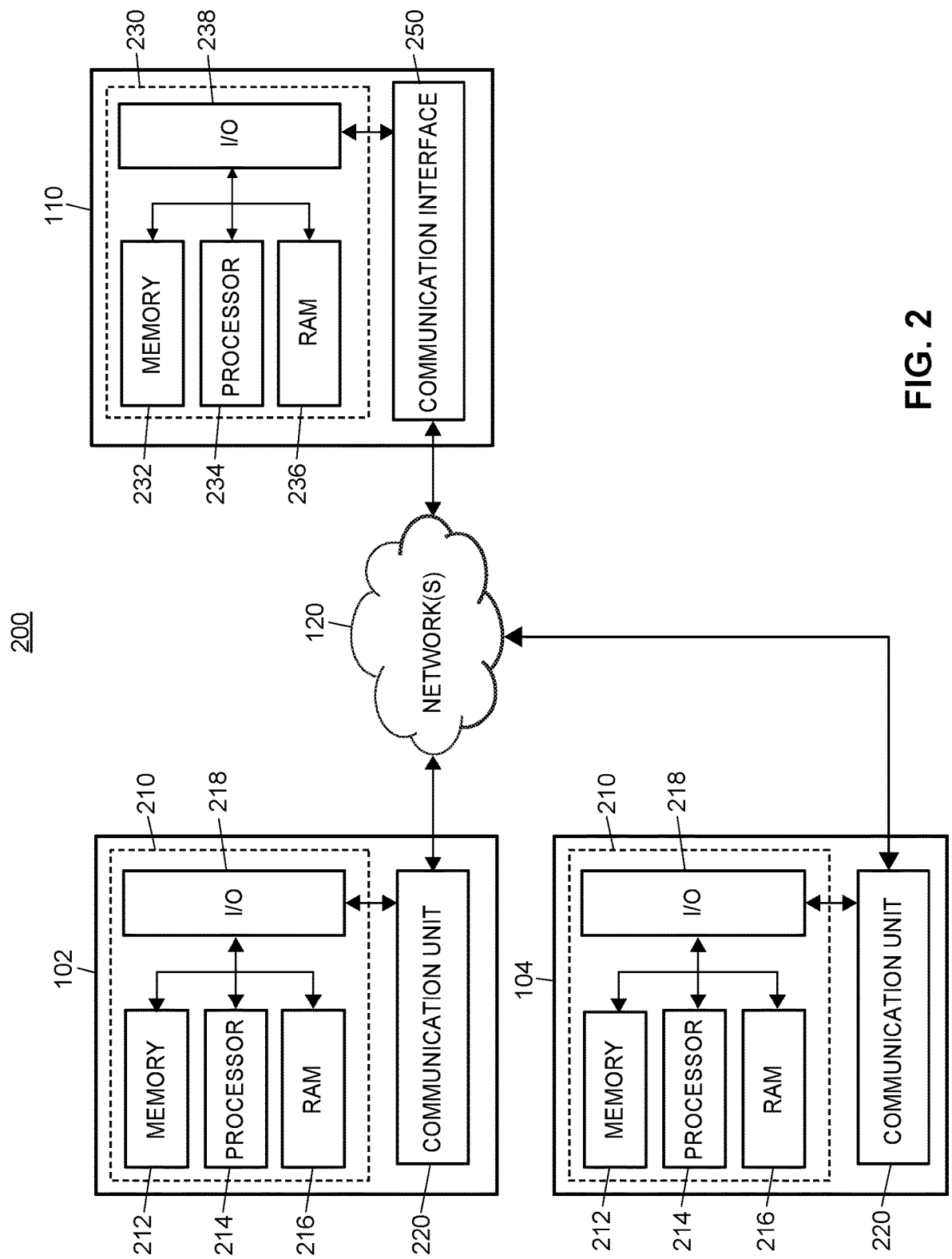
FIG. 2 illustrates a block diagram of an example communication system showing further details of certain components within the mobile computing environment.

FIG. 2 illustrates a block diagram of an example communication system 200 showing further details of certain components within the mobile communication environment 100. The communication system 200 includes the first UE 102 and the second UE 104, which are each connected via a network 120 to the IMS component 110. Additional or alternative components may be included in various embodiments.

Each UE 102 or 104 may be a mobile telephony and computing device, such as a smartphone, a network-enabled tablet computer, or similar mobile device capable of receiving and processing electronic information through a wireless network. Each UE 102 or 104 includes a controller 210 that stores and processes electronic data and a communication unit 220 that communicates with external computing devices (e.g., IMS component 110) via the network 120. In addition, each UE 102 or 104 may further include input and output components, internal sensors, or other components to enhance the functionality of the UE that are not shown in FIG. 2.

The controller 210 receives, processes, produces, transmits, and stores data. The controller 210 includes a memory 212 storing processor-executable instructions in a non-transitory medium, one or more processors 214 configured to execute computer-readable instructions, a random access memory (RAM) 216 for temporary memory, and an I/O circuit 218. The components of the controller 210 may be interconnected via an address/data bus or other means. It should be appreciated that although FIG. 2 depicts only one processor 214, the controller 210 may include multiple processors 214 in some embodiments. Similarly, the controller 210 may include multiple RAMs 216 and multiple memories 212. Although the communication system 200 depicts the I/O circuit 218 as a single block, the I/O circuit 218 may include a number of different I/O circuits, which may be configured for specific I/O operations. The processor 214 may include one or more processors of any known or hereafter developed type, including general-purpose processors or special-purpose processors. Similarly, the controller 210 may implement the RAM 216 and memory 212 as semiconductor memories, magnetically readable memories, optically readable memories, or any other type of memory.

The communication unit 220 manages communication between the controller 210 and external devices (e.g., the IMS component 110) communicatively connected to the UE 102 or 104. The communication unit 220 may transmit and receive wired or wireless communications with external devices, using any suitable wireless communication protocol network, such as a wireless telephony network (e.g., GSM, CDMA, LTE, 5G, etc.), a Wi-Fi network (802.11 standards), a WiMAX network, etc. In addition, the controller 210 of the UEs 102 or 104 may further be configured to communicate data through the communication unit 220 using any suitable data protocol, including encoding schemes for video communication over IP (e.g., H.264/MPEG-4 AVC or H.265/HEVC). Furthermore, the communication unit 220 may provide input signals to the controller 210 via the I/O circuit 218.

The IMS component 110 likewise includes a controller 230 that stores and processes electronic data and a communication interface 250 that communicates with external computing devices (e.g., UEs) via the network 120. As with the UEs 102 and 104, the controller 230 of the IMS component 110 receives, processes, produces, transmits, and stores data. The controller 230 includes a memory 232, a processor 234, a RAM 236, and an I/O circuit 238, each configured and operating analogously to the corresponding components of the controller 210 described above. The IMS component 110 also includes a communication interface 250 configured to send and receive communications between the IMS component 110 and external computing devices (e.g., UEs or other IMS components 110) via a data network connection (e.g., network 120). In some embodiments, the network 120 may be configured in accordance with a new radio (5G NR) protocol, and the communication interface 250 may interface with a core network of the communication network. The communication interface 250 may include software and hardware components configured to enable communication via the network 120 using standard or specialized communication protocols, such as those discussed above with respect to the communication units 220.

Figure 3:
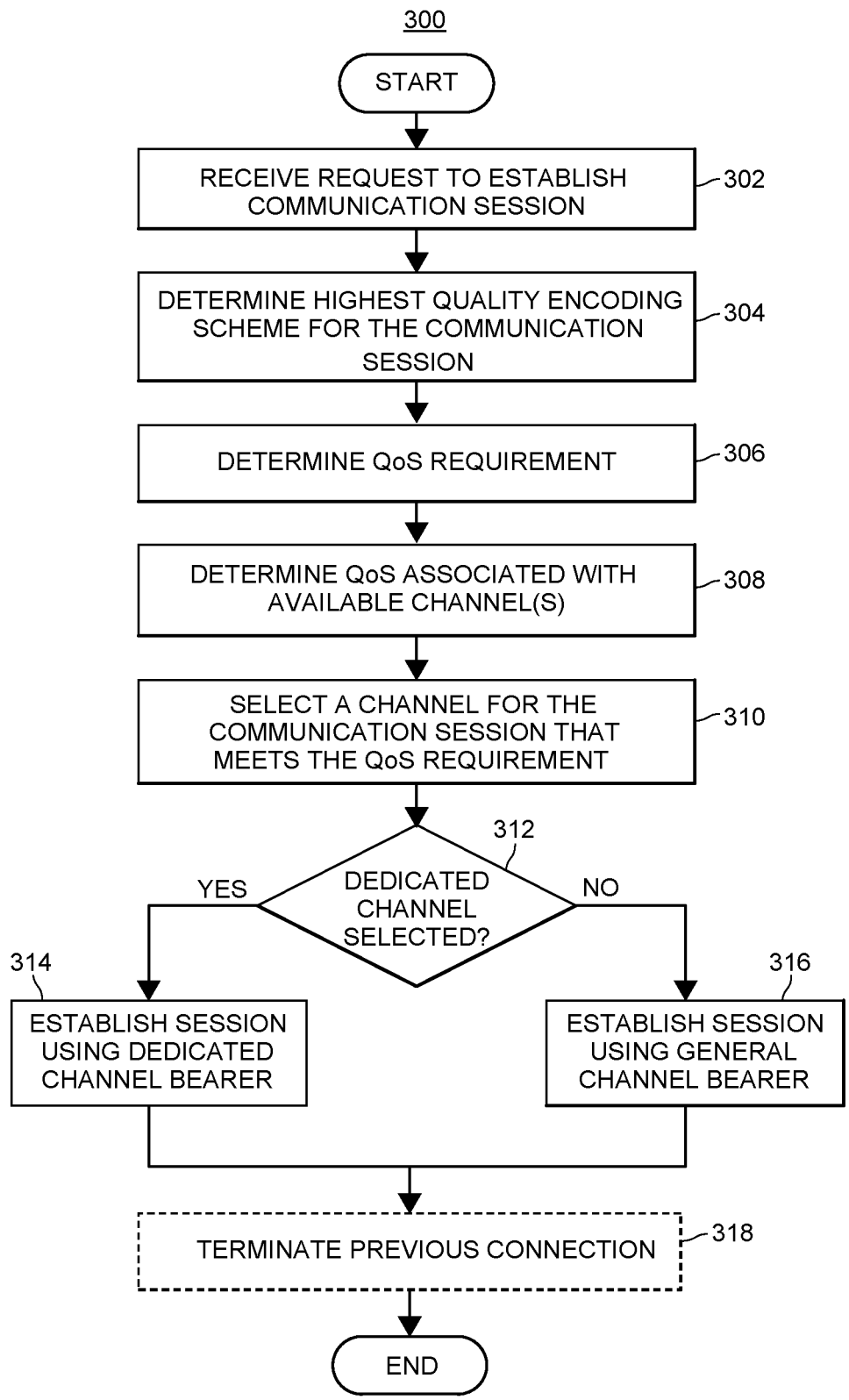
FIG. 3 illustrates a flow diagram of an exemplary QoS-based channel selection method for establishing communication sessions between UEs.

FIG. 3 illustrates a flow diagram of an exemplary QoS-based channel selection method 300 for establishing communication sessions between UEs. The QoS-based channel selection method 300 may be implemented by the IMS component 110 to establish a communication session between the first UE 102 and the second UE 104 via the communication network. The IMS component 110 may receive and transmit data via the communication interface 250. In some embodiments, the communication session may be established while another communication session is ongoing to change the communication session, such as by upgrading from a voice communication session to a video communication session or by downgrading from a video communication session to a voice communication session. Although described herein with reference to two UEs 102 and 104, it should be understood that a communication session can be established between any number of UEs (e.g., conference calls).

The QoS-based channel selection method 300 may begin with receipt of a request to establish (or change) a communication session between UEs (block 302). Using information regarding UE capabilities, a highest quality encoding scheme usable for the communication session is identified (block 304), and a corresponding QoS requirement needed to support such highest quality encoding scheme is determined (block 306). Levels of QoS are then determined for one or more network channels (block 308) and used to select a channel for the communication session that meets the QoS requirement (block 310). If the selected channel is a dedicated communication channel (e.g., supporting GBR bearers) (block 312), the communication session is established over a bearer of the dedicated communication channel (block 314). If the selected channel is a general communication channel (e.g., supporting non-GBR bearers) (block 312), the communication session is established over a bearer of the general communication channel (block 316). In some embodiments, a previous connection may then be terminated (block 318), such as when a communication session is upgraded or downgraded from an ongoing communication session.

At block 302, the IMS component 110 receives a request to establish the communication connection from the first UE 102 via the communication interface 250. The request to establish the communication connection includes indicators of one or both of a type of the communication session and the second UE 104. The request may also include an indication of one or more encoding schemes supported by the first UE 102 for the indicated type of communication session. For example, the IMS component 110 may receive a request using Session Initiation Protocol (SIP) and Session Description Protocol (SDP) indicating a list of available encoding schemes for video communication (e.g., H.264 and H.265). In some embodiments, the IMS component 110 may also obtain similar information from the second UE 104, as described below. In further embodiments, the request to establish the communication connection may be a request to change an ongoing communication session by upgrading from a voice communication session to a video communication session or by downgrading from a video communication session to a voice communication session.

At block 304, the IMS component 110 determines a highest quality encoding scheme available for the communication session. The highest quality encoding scheme may be determined as the highest ranked encoding scheme included in lists of both the first UE 102 and the second UE 104. For example, the first UE 102 may support both H.264 and H.265 encoding, where H.265 provides superior performance, but the second UE 104 may only support H.264 communication. In such case, the highest quality encoding scheme may be determined to be H.264, which is the only scheme supported by both UEs 102 and 104. In some embodiments, the highest quality encoding scheme may instead by determined separately for each UE, in which case the foregoing example would result in the H.265 codec being determined to be the highest quality encoding scheme for the first UE 102, while the H.264 codec is determined to be the highest quality encoding scheme for the second UE 104. In further embodiments, the IMS component 110 may query the database 130 to obtain a list of one or more permitted encoding schemes, which may be associated with either the first UE 102 or with the second UE 104. Based upon such list of permitted encoding schemes, the IMS component 110 may further limit the encoding schemes from which the highest quality encoding scheme may be selected. In some such embodiments, the list of permitted encoding schemes may be used to determine a rank ordering of the encoding schemes. In other embodiments, the ranking of the encoding schemed may be provided by the UEs.

At block 306, the IMS component 110 determines a QoS requirement for supporting communication sessions associated with the highest quality encoding scheme. The QoS requirement indicates a minimum level of acceptable QoS along one or more metrics for the type of communication session. For example, the QoS requirement may be specified in terms of standard QoS levels (e.g., the QCI levels for LTE networks or 5QI levels for 5G networks established by 3GPP) or other criteria, such as a maximum latency or a minimum throughput.

At block 308, the IMS component 110 determines levels of QoS for one or more network channels of the communication network relevant to the communication session to be established. This determination may simply include identifying the fixed levels of QoS associated with one or more of a plurality of available network channels associated with data radio bearers. In some embodiments, the IMS component 110 may only determine the level of one general communication channel (e.g., a general communication non-GBR channel) for use in determining whether such general communication channel meets the QoS requirement. The level of QoS for a channel may be determined as a general or typical level, an expected or predicted level under current conditions (e.g., date, time, weather, location, etc.), or a current level of QoS measured using current network characteristic data. Thus, in some embodiments, the IMS component 110 may query a network database to obtain network characteristic data relating to the level of QoS associated with one or more channels, which network characteristic data may be static or dynamic data regarding the channels. In some such embodiments, the network characteristic data may include current network congestion data, such as current network usage levels.

At block 310, the IMS component 110 selects a channel for the communication session that meets the determined QoS requirement of the highest quality encoding scheme. Such selection may be based upon a comparison of the determined one or more levels of QoS for the network channels against the QoS requirement. In some embodiments, the IMS component 110 may select the channel by determining whether a general communication channel meets the QoS requirement and selecting the general communication channel whenever the general communication channel meets the QoS requirement. For example, the IMS component 110 may determine that a non-GBR channel meets the QoS requirement for a video communication session using a specified encoding scheme and select the non-GBR channel for the video communication session. In further embodiments, the IMS component 110 may determine the most preferred channel (e.g., the least congested channel or the channel resulting in the least network traffic isolation) that meets the QoS requirement from a plurality of available channels based upon the determined QoS levels of the channels. In embodiments in which no channel meets the QoS requirement, the IMS component 110 may select the available communication channel having the highest QoS, may change the type of the communication session (e.g., from a video call to a voice call), or may notify the UEs the communication session cannot be completed.

At block 312, the QoS-based channel selection method 300 may proceed based upon whether the selected channel is a dedicated communication channel (e.g., a GBR channel). If the selected channel is a dedicated communication channel, the IMS component 110 communicates with at least the first UE 102 to instruct the first UE 102 to establish the communication session using a data radio bearer of the selected dedicated communication channel at block 314. If the selected channel is a general communication channel, the IMS component 110 communicates with at least the first UE 102 to instruct the first UE 102 to establish the communication session using a data radio bearer of the selected general communication channel at block 316. The first UE 102 and the second UE 104 may then communicate during the communication session according to known techniques, until the session ends or is changed.

At block 318, in some embodiments in which the QoS-based channel selection method 300 is implemented to change the type of an ongoing communication session, the previous connection through another network channel may be terminated after the new (changed) communication session is established. The first UE 102 may thus disconnect from a data radio bearer associated with the previous communication channel. The QoS-based channel selection method 300 then terminates.

Figure 4:
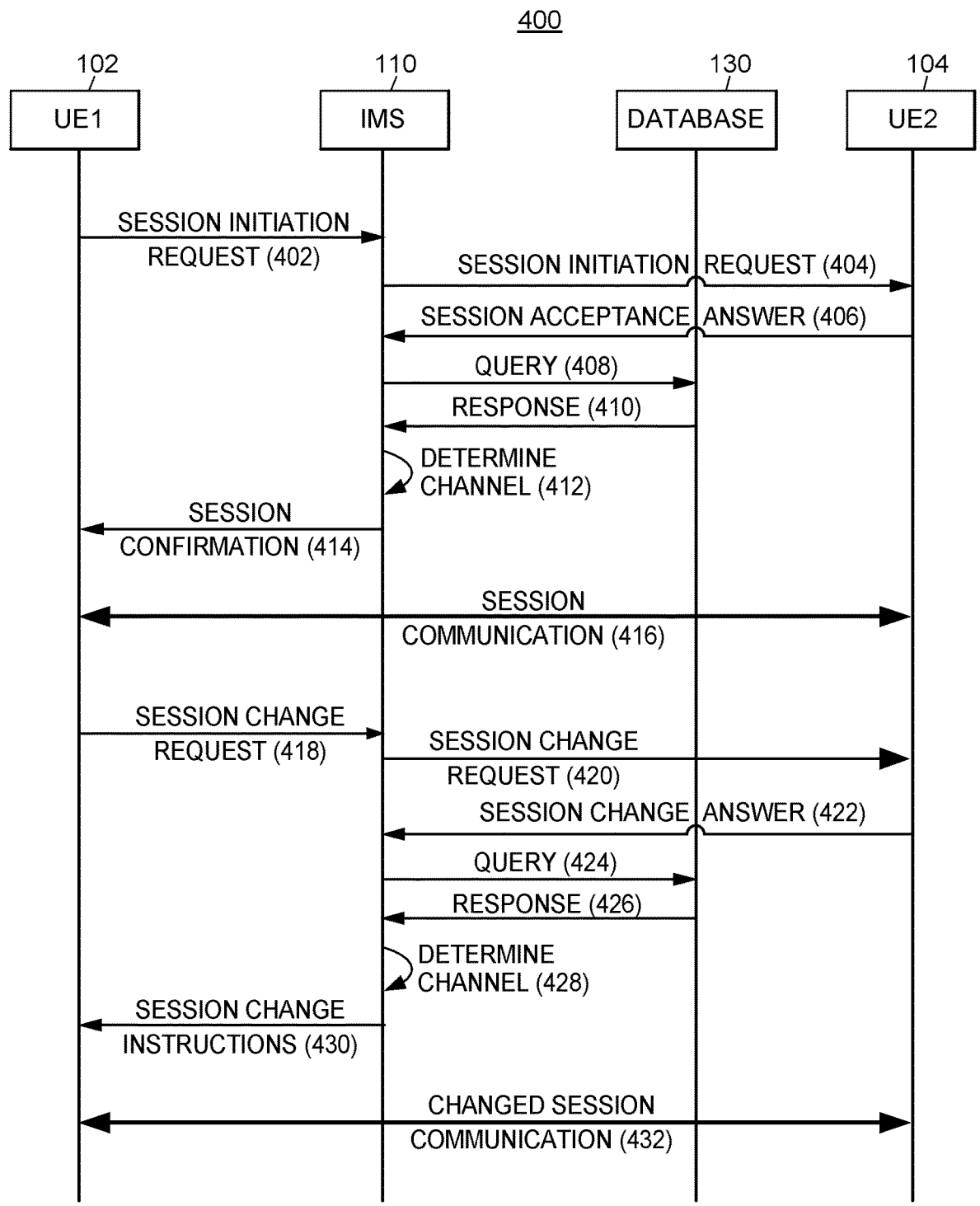
FIG. 4 illustrates a sequence diagram of QoS-based communication, such as by the QoS-based channel selection method.

FIG. 4 illustrates a sequence diagram of QoS-based communication 400, such as by the QoS-based channel selection method 300. Communication by messages or signals between the first UE 102, the IMS component 110, the database 130, and the second UE 104 is illustrated. Although the communication is illustrated with particular reference to the first UE 102, additional communication with the second UE 104 may occur.

The QoS-based communication 400 begins with a session initiation request 402 from the first UE 102 to the IMS component 110. The session initiation request 402 may include details of the requested session, such as the type of session and the encoding schemes supported by the first UE 102. The session initiation request 402 may further identify the second UE 104. Upon receiving the session initiation request 402, the IMS component 110 transmits a further session initiation request 404 to the second UE 104, which may accept or reject the request. When the second UE 104 transmits a session acceptance answer 406 to the IMS component 110, the IMS component 110 may take actions to determine the appropriate data radio bearer for the communication session. The session acceptance answer 406 may include a list of one or more encoding schemes supported by the second UE 104 for the type of communication session indicated in the session initiation request 404.

In some embodiments, the IMS component 110 may transmits a query 408 to the database 130 to obtain a response 410 from the database 130 containing network characteristic data or account data, such as current network congestion data or a list of permitted encoding schemes associated with one or both of the first UE 102 or the second UE 104. Using at least the information regarding the encoding schemes supported by the first UE 102, the IMS component 110 determines a channel for the communication session (line 412). To determine the channel, the IMS component 110 first identifies a highest quality encoding scheme. In some embodiments, the highest quality encoding scheme may be identified from encoding schemes included in two or more of the following: the list of encoding schemes supported by the first UE 102, the list of encoding schemes supported by the second UE 104, and the list of permitted encoding schemes received from the database 130. In further embodiments, determining the channel for the communication session may include determining a data radio bearer associated with the channel.

The IMS component 110 next transmits a session confirmation 414 to the UE 102 to provide the parameters of the communication session, including the channel or data radio bearer for the communication session. The communication session 416 is then established between the first UE 102 and the second UE 104, and the UEs communicate real-time video and/or voice data over the specified channel during the communication session. The communication session may conclude and terminate. In some embodiments, however, the communication session may be upgraded (e.g., from a voice call to a video call) or downgraded (e.g., from a video call to a voice call) while the communication session is ongoing.

In such embodiments, the IMS component 110 may receive a session change request 418 from the first UE 102 and transmit a further session change request 420 to the second UE 104, which may indicate the desired type of the communication session. Upon receiving a session change answer 422, in some embodiments, the IMS component 110 may again send a query 424 to the database 130 and receive a response 426 from the database 130 containing information relating to the desired type of the changed communication session. The IMS component 110 may then determine a channel for the changed (e.g., upgraded or downgraded) communication session (line 428) according to the same techniques for determining a channel for an initial communication session discussed above. The IMS component 110 then sends a session change instruction 430 (which may indicate a change in the channel) to the first UE 102 to cause the first UE 102 to establish the changed communication session 432. In some such embodiments, the first UE 102 may disconnect with a previous data radio bearer after establishing the changed communication session over the new data radio bearer. The changed communication session 432 then continues until either changed or terminated.

It should also be understood that, unless a term is expressly defined in this patent using the sentence "As used herein, the term '____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Although the techniques disclosed herein are described with reference to video communications between two UEs (i.e., video calling), it should be understood that the techniques can be applied to other types of real-time communication sessions between two or more UEs. Throughout this specification, plural instances may implement components, operations, or structures described as a single instance. For example, multiple IMS components 110 (e.g., IMS systems or devices maintained by multiple network carriers or covering different geographic areas) may be communicatively connected to implement parts of the techniques described herein.

Although individual operations of one or more methods are illustrated and described as separate operations, one or more of the individual operations may be performed concurrently, and nothing requires that the operations be performed in the order illustrated. Structures and components functionality presented as separate components in example configurations may be implemented as a combined structure or component. Similarly, structures and components functionality presented as a single component may be implemented as separate components. These and other variations, modifications, additions, and improvements fall within the scope of the subject matter herein.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

What is claimed:

1. A system for user-equipment (UE) controlled quality of service (QoS) allocation, the system comprising:
    a communication interface communicatively coupled to a communication network, wherein the communication network is configured to support two or more levels of QoS, wherein a first level of QoS of the two or more levels of QoS is a guaranteed bit rate (GBR) level of QoS and a second level of QoS of the two or more levels of QoS is a non-GBR level of QoS, wherein the first level of QoS corresponds to a first channel for supporting data radio bearers assigned a GBR level of QoS and the second level of QoS corresponds to a second channel for supporting data radio bearers assigned a non-GBR level of QoS, and wherein the first channel supports fewer concurrent data radio bearers than the second channel;
    one or more non-transitory storage media configured to store processor-executable instructions;
    one or more processors operatively connected to the communication interface and the one or more non-transitory storage media and configured to execute the processor-executable instructions to cause the system to:
        receive, via the communication interface and from a first UE, a request to establish a communication session with a second UE, the request indicating a type of the communication session and one or more encoding schemes supported by the first UE for communications associated with the indicated type of the communication session;
        analyze the one or more encoding schemes to identify a highest quality encoding scheme of the one or more encoding schemes;
        determine a QoS requirement to support communications sessions associated with the highest quality encoding scheme;
        determine the second level of QoS meets the QoS requirement associated with the highest quality encoding scheme;
        determine that the second channel meets the QoS requirement; and
        cause the first UE to initially establish the communication session using a data radio bearer associated with the second channel.

2. The system of claim 1, wherein:
the one or more processors are communicatively coupled to a network database; and
the processor-executable instructions, when executed, further cause the system to:
    query network characteristic data relating to QoS of at least the second channel from the network database; and
    determine the second level of QoS corresponding to the second channel from the network characteristic data.

3. The system of claim 2, wherein the network characteristic data comprises current network congestion data.

4. The system of claim 1, wherein:
the one or more processors are communicatively coupled to an account database; and
the processor-executable instructions that cause the system to identify the highest quality encoding scheme cause the system to:
    query an account record associated with the first UE from the account database to obtain a list of permitted encoding schemes; and
    identify the highest quality encoding scheme from at least one encoding scheme that is included in the list of permitted encoding schemes and that is included in the one or more encoding schemes supported by the first UE.

5. The system of claim 1, wherein:
the request to establish the communication session includes an identifier associated with the second UE;
the processor-executable instructions, when executed, further cause the system to:
    transmit, via the communication interface and to the second UE, an indication of the request to establish the communication session; and
    receive, via the communication interface and from the second UE, a list of encoding schemes supported by the second UE for communications associated with the indicated type of communication session; and
the processor-executable instructions that cause the system to identify the highest quality encoding scheme cause the system to:
    identify the highest quality encoding scheme from at least one encoding scheme that is included in the list of encoding schemes supported by the second UE and that is included in the one or more encoding schemes supported by the first UE.

6. The system of claim 1, wherein:
the processor-executable instructions, when executed, further cause the system to:
    receive a request to upgrade an ongoing voice communication session with the second UE to a video communication session; and
    following the first UE establishing the communication session using the data radio bearer associated with the second channel, cause the first UE to disconnect from another data radio bearer associated with the first channel.

7. The system of claim 1, wherein:
the communication session is a video communication session; and
the processor-executable instructions, when executed, further cause the system to:
    receive, via the communication interface and from the first UE, a request to downgrade the communication session to a voice communication session;
    cause the first UE to establish a connection via another data radio bearer associated with the first channel for the voice communication session; and
    cause the first UE to disconnect from the data radio bearer associated with the second channel.

8. The system of claim 1, wherein the data radio bearer is an end-to-end bearer.

9. The system of claim 1, wherein the data radio bearer is an evolved packet system (EPS) bearer.

10. The system of claim 1, wherein the communication network is configured in accordance with a new radio protocol and the communication interface interfaces with a core network of the communication network.

11. A method for user-equipment (UE) controlled quality of service (QoS) allocation, the method comprising:
receiving, at a communication interface via a communication network from a first UE, a request to establish a communication session, the request indicating a type of the communication session and one or more encoding schemes supported by the first UE for communications associated with the indicated type of the communication session, wherein the communication network is configurable to support two or more levels of QoS, wherein a first level of QoS of the two or more levels of QoS is a guaranteed bit rate (GBR) level of QoS and a second level of QoS of the two or more levels of QoS is a non-GBR level of QoS, wherein the first level of QoS corresponds to a first channel for supporting data radio bearers assigned a GBR level of QoS and the second level of QoS corresponds to a second channel for supporting data radio bearers assigned a non-GBR level of QoS, and wherein the first channel supports fewer concurrent data radio bearers than the second channel;
analyzing, via one or more processors operatively connected to the communication interface, the one or more encoding schemes to identify a highest quality encoding scheme of the one or more encoding schemes;
determining, via the one or more processors, a QoS requirement to support communications sessions associated with the highest quality encoding scheme;
determining, via the one or more processors, the second level of QoS meets the QoS requirement associated with the highest quality encoding scheme;
determining, via the one or more processors, that the second channel meets the QoS requirement; and
causing, via the one or more processors, the first UE to initially establish the communication session using a data radio bearer associated with the second channel.

12. The method of claim 11, wherein the one or more processors are communicatively coupled to a network database, and further comprising:
querying, by the one or more processors, network characteristic data relating to QoS of at least the second channel from the network database; and
determining, by the one or more processors, the second level of QoS corresponding to the second channel from the network characteristic data.

13. The method of claim 12, wherein the network characteristic data comprises current network congestion data.

14. The method of claim 11, further comprising:
receiving a request to establish the communication session is a request to upgrade an ongoing voice communication session with the second UE to a video communication session; and
causing, by the one or more processors, the first UE to disconnect from another data radio bearer associated with the first channel following the first UE establishing the communication session using the data radio bearer associated with the second channel.

15. The method of claim 11, wherein the communication session is a video communication session; and further comprising:
receiving, via the communication interface and from the first UE, a request to downgrade the communication session to a voice communication session;
causing, by the one or more processors, the first UE to establish a connection via another data radio bearer associated with the first channel for the voice communication session; and
causing, by the one or more processors, the first UE to disconnect from the data radio bearer associated with the second channel.

16. A tangible, non-transitory computer-readable medium storing processor-executable instructions that, when executed by one or more processors of a system, cause the system to:
receive, a request to establish a communication session from a first UE via a communication interface communicatively coupled to a communication network, the request indicating a type of the communication session and one or more encoding schemes supported by the first UE for communications associated with the indicated type of the communication session, wherein the communication network is configurable to support two or more levels of QoS, wherein a first level of QoS of the two or more levels of QoS is a guaranteed bit rate (GBR) level of QoS and a second level of QoS of the two or more levels of QoS is a non-GBR level of QoS, wherein the first level of QoS corresponds to a first channel for supporting data radio bearers assigned a GBR level of QoS and the second level of QoS corresponds to a second channel for supporting data radio bearers assigned a non-GBR level of QoS, and wherein the first channel supports fewer concurrent data radio bearers than the second channel;
analyze the one or more encoding schemes to identify a highest quality encoding scheme of the one or more encoding schemes;
determine a QoS requirement to support communications sessions associated with the highest quality encoding scheme;
determine the second level of QoS meets the QoS requirement associated with the highest quality encoding scheme;
determine that the second channel meets the QoS requirement; and
cause the first UE to initially establish the communication session using a data radio bearer associated with the second channel.

17. The tangible, non-transitory computer-readable medium of claim 16, wherein the processor-executable instructions, when executed, further cause the system to:
query network characteristic data relating to QoS of at least the second channel from a network database via the communication interface; and
determine the second level of QoS corresponding to the second channel from the network characteristic data.

18. The tangible, non-transitory computer-readable medium of claim 16, wherein the network characteristic data comprises current network congestion data.

19. The tangible, non-transitory computer-readable medium of claim 16, wherein
the processor-executable instructions, when executed, further cause the system to:
receive a request to establish the communication session is a request to upgrade an ongoing voice communication session with the second UE to a video communication session; and following the first UE establishing the communication session using the data radio bearer associated with the second channel, cause the first UE to disconnect from another data radio bearer associated with the first channel.

20. The tangible, non-transitory computer-readable medium of claim 16, wherein:
the communication session is a video communication session; and
the processor-executable instructions, when executed, further cause the system to:
receive, via the communication interface and from the first UE, a request to downgrade the communication session to a voice communication session;
cause the first UE to establish a connection via another data radio bearer associated with the first channel for the voice communication session; and
cause the first UE to disconnect from the data radio bearer associated with the second channel.

* * * * *